L. C. SMOOT.
VEHICLE WHEEL.
APPLICATION FILED JULY 15, 1910.

1,004,703.

Patented Oct. 3, 1911.

WITNESSES:
W. M. Parham.
J. S. Murray

INVENTOR
Lonnie C. Smoot
BY
John M. Spellman
ATTORNEY

UNITED STATES PATENT OFFICE.

LONNIE C. SMOOT, OF HILLSBORO, TEXAS.

VEHICLE-WHEEL.

1,004,703. Specification of Letters Patent. Patented Oct. 3, 1911.

Application filed July 15, 1910. Serial No. 572,124.

*To all whom it may concern:*

Be it known that I, LONNIE C. SMOOT, a citizen of the United States, residing at Hillsboro, in the county of Hill and State of Texas, have invented certain new and useful Improvements in Vehicle-Wheels, of which the following is a specification.

My invention relates to new and useful improvements in vehicle wheels, and more particularly to wheels for automobiles. Its object is to provide a vehicle wheel equipped with a resilient metallic substitute for the pneumatic tire, which will be more durable than such a tire and less subject to repairs.

Another object is to provide a vehicle wheel having a plurality of coiled springs mounted radially from the hub, to take up the shocks and jars imparted to the rim.

A further object of the invention is to provide a sectional tread for the wheel, and to provide a link mechanism acting upon the radial springs from the component sections of the tread, so arranged that a displacement of one tread section will produce a compression of all of the springs.

Finally the object of the invention is to provide a device of the character described that will be strong, durable, simple and efficient, and comparatively easy to construct, and one which will not be likely to get out of working order.

Figure 2:
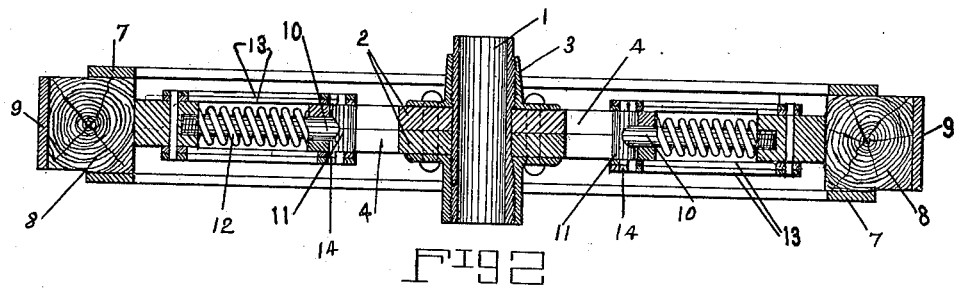
Figure 1:
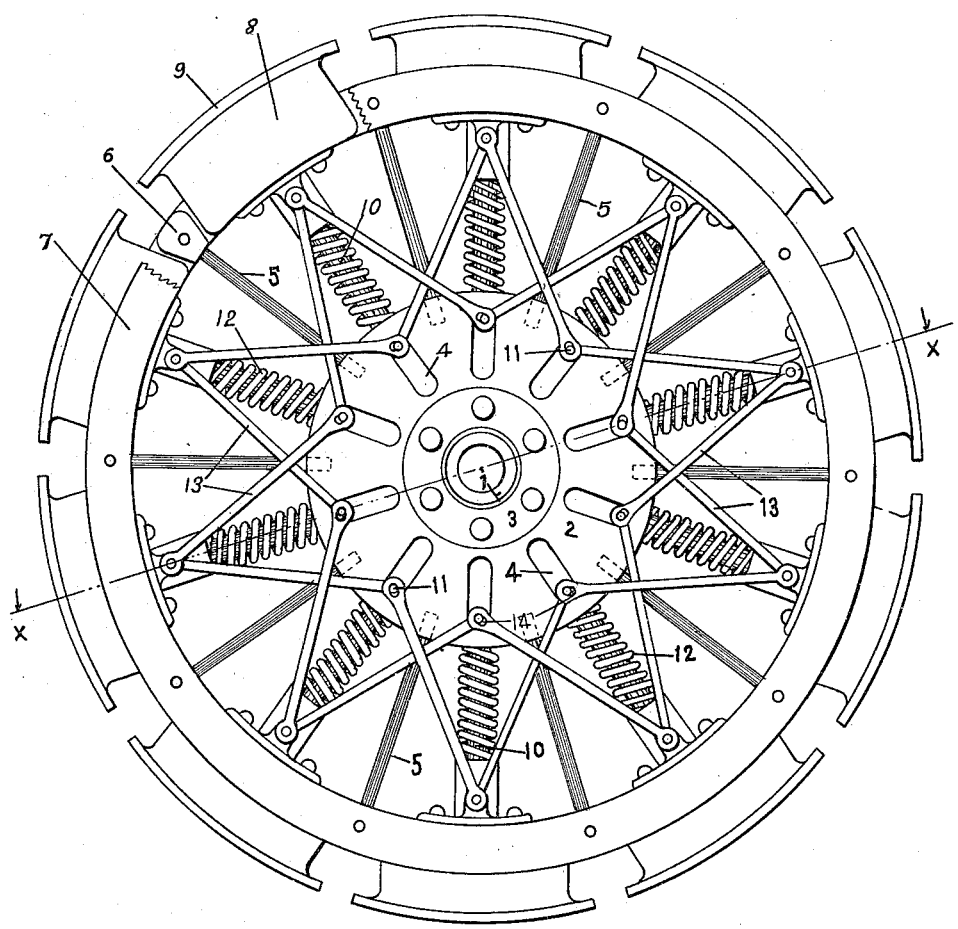

With these and various other objects in view, my invention has relation to certain novel features of the construction and operation, an example of which is described in the following specification, and illustrated in the accompanying drawing, wherein:

Figure 1 is a side elevation of the wheel. Fig. 2 is a cross-section taken through the center of the wheel upon the line *x—x* of Fig. 1.

Referring now more particularly to the drawing, wherein like numerals of reference designate similar parts in both the figures, the numeral 1 denotes a cylindrical sleeve forming the hub of the wheel. Centrally upon this hub are mounted a pair of contiguous disks 2, which are held in place by flanges 3, threaded upon the sleeve 1. The disks 2 are provided with a plurality of radial slots 4, the purpose of which is made clear hereinafter. A number of spokes 5, each of which carries a block 6 upon its outer extremity, are clamped between the disks 2, said spokes being arranged in alternation with the slots 4. A metal ring 7 is rigidly attached to the blocks 6 at each side of said blocks. In the rectangular apertures formed between each pair of adjacent blocks 6 and the rings 7, are mounted a plurality of wooden blocks 8, which are adapted to undergo a slight radial displacement. Each of these blocks has a section of metallic tire 9 secured to its outer surface, forming the tread of the wheel. The blocks 8 are each rigid upon the outer extremity of a radial rod 10, which rod carries upon its inner extremity a transverse arm 11 mounted in one of the grooves 4. Upon each of the rods 10 is mounted a coiled spring 12, adapted to be compressed by any inward displacement of the blocks 8. To each block 8 are pivotally attached the outer extremities of two pairs of links 13, which links extend tangentially inward, one pair on each side of the rods 10. The links of each pair have their inner extremities pivoted upon the arms 11 which are at each side of the arm 11 that is in radial alinement with the outer extremities of the pair of links. The inner extremity of each of these links is provided with a slot 14 longitudinal with the link. This arrangement prevents a pair of links, the outer extremities of which are pivoted upon the outer end of a rod 10, from being subject to a compression when the rod 10 is displaced inwardly. The inward displacement of one rod 10 will be communicated from the inner extremity thereof to the outer extremities of the rod 10 next adjacent, the communication being affected by a tension in the links 13. These links thus form two star shaped mechanisms the points of the stars being adapted to move inward and the springs 12 being mounted between the outer points of one star and the inner points of the other.

The above wheel is superior to wheels using pneumatic tires not only in durability and economy, but also in the quality of the service given, since there can be no punctures or blow-outs, and the sectional construction will act to prevent slipping.

What I claim is:

1. A mechanism consisting of a plurality of radial rods, means being provided to guide each rod under radial displacement, a coiled spring mounted upon each rod, the outer extremities of which will move with the rod, while the inner extremities remain stationary, the outer extremities of each rod being connected by a pair of links with the inner extremities of the two adjacent rods.

2. In a vehicle wheel, the combination with the hub thereof, of a ring rigidly supported from the hub, a plurality of felly sections mounted in said ring, adapted to undergo radial displacement, a radial rod upon the outer extremity of which each felly section is mounted, means carried by the hub serving to guide the inner extremities of said rods during displacement, a spring coiled upon each rod adapted to be compressed by inward displacement of said rod, and a pair of links having their outer extremities pivotally mounted upon the outer end of each rod and their slotted inner extremities pivoted upon the inner ends of the rods adjacent to said rod.

3. In a vehicle wheel, the combination with the hub thereof, of a disk fast upon said hub, provided with a plurality of radial slots, a ring rigidly supported from the hub and concentric therewith, a plurality of felly sections mounted in said ring and adapted to undergo radial displacement, a radial rod upon the outer extremity of which each felly section is mounted, an arm carried by the inner extremity of each rod slidably mounted in one of the slots of said disk, a spring coiled upon each rod adapted to be compressed by inward displacement of the rod, and a pair of links having their outer extremities pivoted upon the outer ends of each rod and their inner extremities pivoted upon the arms carried by the rods adjacent to the rod in question.

4. In a vehicle wheel, the combination with the hub thereof, of a disk rigidly mounted upon the hub having a plurality of radial slots therein, a plurality of radial spokes rigidly mounted in said disk, blocks carried by the outer extremities of each spoke, a pair of rings concentric with the hub secured to said blocks at each side thereof, felly sections slidably mounted in the apertures formed between the rings and between said blocks, a radial rod upon the outer extremity of which each felly section is mounted, an arm carried by the inner extremity of each rod slidably mounted in one of the slots of said disk, a spring coiled upon each rod adapted to be compressed by inward displacement of said rod, and a pair of links having their outer extremities pivoted upon the outer ends of each rod at each side thereof, the inner extremities of said links being pivoted upon the arms carried by the rods adjacent to the rods in question.

In testimony whereof I have signed my name to this specification in the presence of two subscribing witnesses.

LONNIE C. SMOOT.

Witnesses:
H. G. HART,
GEO. H. WHITE.

Copies of this patent may be obtained for five cents each, by addressing the "Commissioner of Patents, Washington, D. C."